Sept. 15, 1931.  I. L. PULLIAM  1,823,167
METHOD AND APPARATUS FOR WASHING VEHICLES
Filed April 9, 1928  2 Sheets-Sheet 1
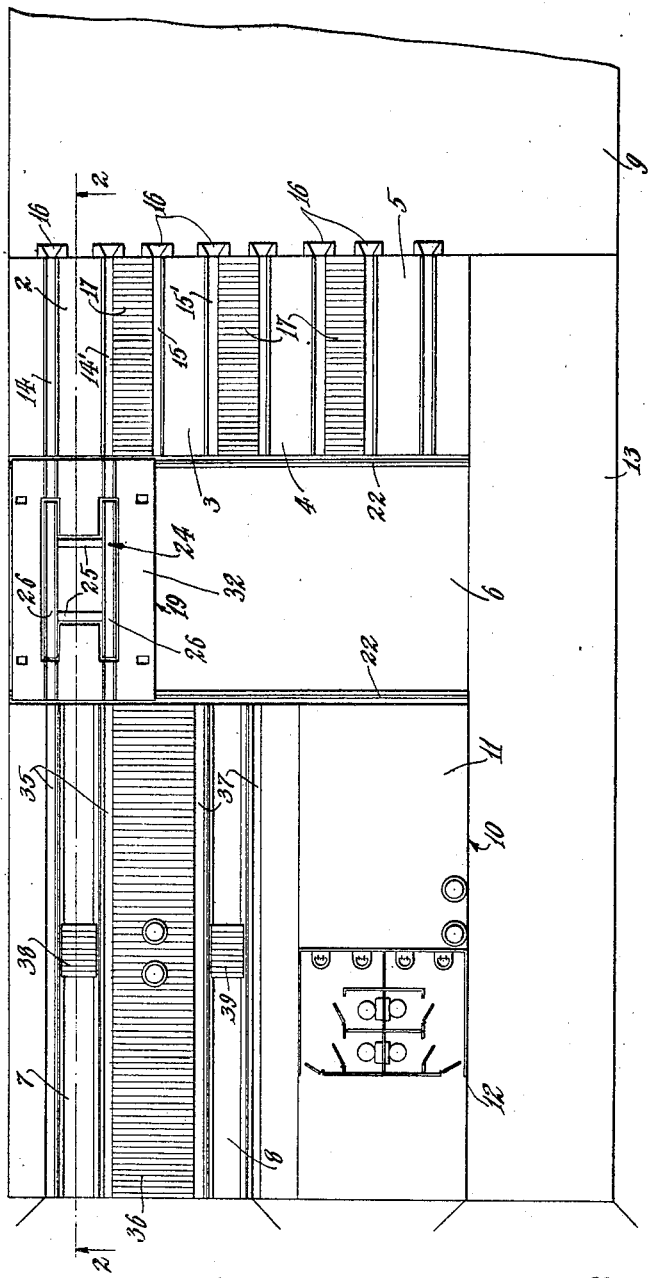
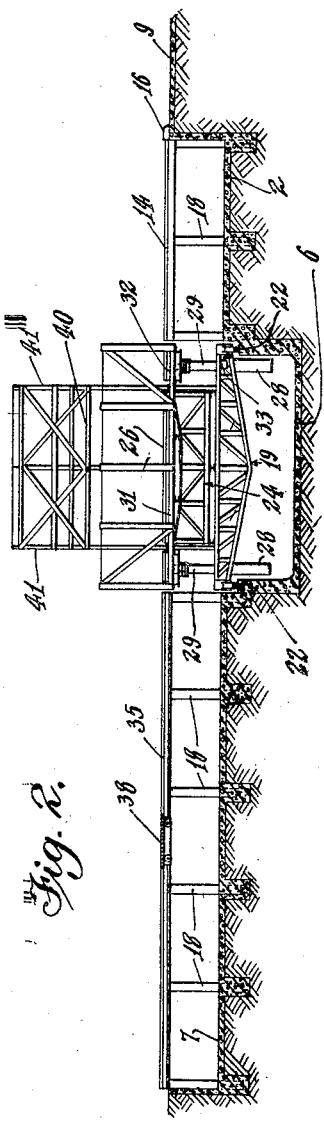
Inventor
Ira L. Pulliam
By Lyon & Lyon
Attorneys Sept. 15, 1931.  I. L. PULLIAM  1,823,167
METHOD AND APPARATUS FOR WASHING VEHICLES
Filed April 9, 1928  2 Sheets-Sheet 2

Inventor
Ira L. Pulliam
By Lyon & Lyon
Attorneys

Patented Sept. 15, 1931

1,823,167

UNITED STATES PATENT OFFICE

IRA L. PULLIAM, OF HUNTINGTON PARK, CALIFORNIA, ASSIGNOR TO RICHFIELD OIL COMPANY OF CALIFORNIA, OF LOS ANGELES, CALIFORNIA, A CORPORATION OF DELAWARE

METHOD AND APPARATUS FOR WASHING VEHICLES

Application filed April 9, 1928. Serial No. 268,474.

This invention relates to a method and apparatus for washing vehicles such as automobiles and the like and particularly relates to a combination and arrangement of elements whereby the apparatus is adapted to wash, clean, polish, lubricate and grease vehicles within a much shorter period of time than it has been possible to accomplish these operations heretofore.

An object of this invention is to disclose and provide a method of washing, cleaning and lubricating vehicles rapidly and with a minimum amount of labor. Another object of this invention is to provide a method for washing and lubricating vehicles whereby the vehicles may be washed and lubricated with great rapidity.

Another object is to provide an apparatus adapted to the lubrication and washing of vehicles with the minimum expenditure of power and labor. Another object is to provide an apparatus whereby all parts of the vehicle may be thoroughly washed and cleaned. Another object of this invention is to provide an apparatus whereby a vehicle may be washed and cleaned while being moved.

Another object is to disclose a combination of elements whereby a large number of vehicles may be washed and lubricated in a very short period of time. Another object is to disclose an apparatus for washing and lubricating vehicles and capable of handling a large number of vehicles on a small plot of ground.

Other objects, uses and advantages of my invention will become apparent to those skilled in the art from the following detailed description of one preferred form of my apparatus and method, reference being had for purposes of illustration to the appended drawings to more fully and clearly describe my invention.

Numerous devices have been used heretofore in an attempt to facilitate the washing, cleaning and lubricating of vehicles such as automobiles. The simplest means of washing vehicles of this nature is merely to allow them to stand upon a floor provided with drainage facilities and wash, clean and polish the car as it remains in a stationary position. This necessarily limits the number of men capable of working upon the vehicle at one time and a great deal of time is consumed.

Attempts have also been made to facilitate the washing operation by causing the vehicles to travel automatically down a long runway, operators being positioned on each side of the runway along its entire length so that the vehicle is washed or certain washing operations are performed thereon when the vehicle reaches the operators equipped with the necessary water, steam, soap solution and other devices adapted to perform the required operations in a predetermined sequence. This particular method of washing vehicles necessitates the use of very long runways and necessarily limits the number of vehicles which may be handled by said method in a given period of time.

Other devices of very complicated nature have also been invented such as, for example, devices for lowering the entire vehicle into a bath of cleansing solution so as to remove the foreign matter adhering to the lower portions of the vehicles. In view of the weight of the vehicles these devices are expensive to make and operate and are incapable of handling large numbers of vehicles in a given period of time. Moreover, it has been impossible heretofore to both lubricate and wash and clean a vehicle at the same time or in a continuous manner while this combined sequence of operations is a distinguishing characteristic of my invention.

Furthermore, when long runways are used upon which the vehicles move continuously it is impossible to thoroughly complete an operation, when from the character of the vehicle being treated a longer time must necessarily be spent thereon than on the average vehicle, without retarding the constant flow or speed at which the vehicles are traveling down the runway. My invention on the other hand, is of great flexibility and enables the operators to spend a longer time on a particular vehicle if this is necessary without retarding the progress of the other vehicles being washed, cleaned or lubricated simultaneously with the exceptional vehicle which is being treated.

As has been said before, washing devices employing a single runway require a runway of great length if it is desired to handle a large number of vehicles and thereby long and large areas of ground are necessary. My invention, however, relates to an apparatus for washing and lubricating a large number of vehicles in a relatively short period of time without necessitating the use of large areas of ground. As a matter of fact, the apparatus described herein for illustrative purposes and shown in Fig. 1 is capable of handling a very large number of vehicles per hour with a relatively small number of operators and the entire apparatus may be placed upon an ordinary or corner city lot measuring 50 x 150 feet in conjunction with a standard gasoline and lubricating oil dispensing station. Heretofore, it would have been necessary to have a runway of approximately 300 feet in length and at least 50 feet wide in order to accommodate a similar number of vehicles per hour and even then it would not be possible to both lubricate and wash vehicles but merely to wash them.

In the appended drawings, which show for illustrative purposes the form of apparatus embodying my invention:

Figure 1 is a plan view of a vehicle washing, cleaning and lubricating apparatus and system placed upon an ordinary city lot and operating in conjunction with a motor fuel service station.

Figure 2 is a vertical section through the apparatus shown in Fig. 1 along the line 2—2.

Figure 3:
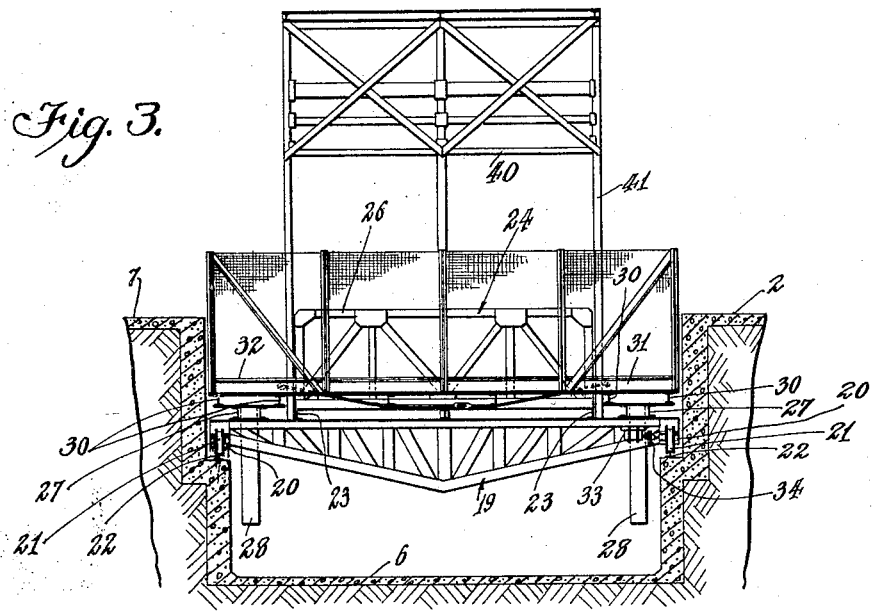
Figure 3 is a side elevation of the washing device on a larger scale.

Referring to the drawings particularly Fig. 1, which shows the general arrangement of parts, the apparatus comprises in combination a plurality of pits 2, 3, 4 and 5 leading to a large transverse pit 6 from which a plurality of longitudinal pits 7 and 8 lead off to an exit. The area on the right of the first mentioned pits, said area being identified by the numeral 9, may be used for parking or waiting purposes by the vehicles to be operated upon while the corner of the area indicated by the numeral 10 may be subdivided into a suitable machinery room 11, a waiting room 12 for patrons or people whose vehicles are being treated and a driveway 13 upon which vehicles may be driven to be supplied with lubricating oil, motor fuel, water or compressed air as in an ordinary service station.

The pits 2, 3, 4 and 5 may be intercommunicating and be provided with short runways or tracks 14 and 14', 15 and 15', etc. The runways or tracks 14 and 15 are preferably substantially on the level with the ground in the area 9 and may be provided with suitable entry guides 16 so as to direct and guide the wheels of vehicles being placed upon the runways. The space between adjoining runways and pits, for example, the space between the pit 2 and pit 3 and particularly between runway 14' and 15, may be covered with a false flooring 17. The tracks or runways 14 and 15 may be supported as indicated in Fig. 2 by means of posts 18 placed at suitable intervals resting in foundations of any desired design.

The longitudinal pits 2, 3, 4 and 5 lead to a transverse pit 6 shown in vertical section in Fig. 2. Although the pits 2 to 5 inclusive are of a depth sufficient to allow operators positioned in the pits to work upon the lower or bottom portions of vehicles positioned upon the runways 14 and 15 (a suitable depth below the runway proper being between 3½ and 4½ feet) the depth of the transverse pit 6 is substantially greater, for example, the transverse pit 6 may be eight to twelve feet deep and of such width as to easily accommodate the largest vehicle which the apparatus is designed to handle. For example, if the apparatus is to be used for washing, cleaning and lubricating automobiles, particularly of the pleasure type, the transverse pit 6 may be from about seventeen to twenty feet wide. The length of the pit 6 naturally depends upon the number of longitudinal pits leading thereinto.

Figure 4:
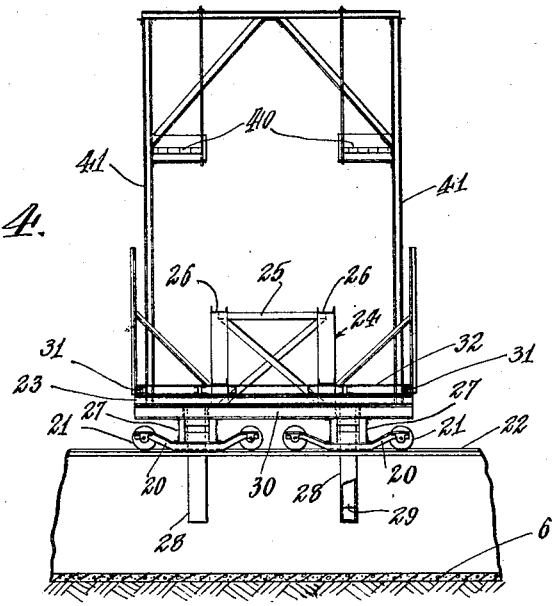
Figure 4 is an end elevation of the transverse washing unit.

The pit 6 is designed to accommodate a novel washing device shown in side elevation in Fig. 2 and in end elevation in Fig. 4. This washing device comprises a movable support girder or truss 19 (which may be a structural member of any suitable design) supported upon trucks 20 having wheels 21 journaled thereon, the wheels 21 being adapted to run along tracks 22 mounted longitudinally on a shelf formed in the sides of the pit 6. Any suitable number or transverse members 19 may be used.

The transverse members 19 may be connected by means of a plurality of members 23 which support a vertical structure 24 whose top may be formed to represent, more or less, a letter H as clearly shown in Fig. 1. This letter H comprises a structure having sides 26 which are formed in the manner of a track or runway and a central connection portion indicated by the numeral 25. The level of the runways 26 and connecting members 25 is substantially the same as the runways 14 and 15.

The transverse members 19 also support a cylinder head frame 27 mounted thereon. Vertical cylinders 28 are connected to the cylinder head frame 27, a plurality of cylinders 28 being used, preferably one mounted between or near each of the four trucks 20 used to support and carry the bridge members 19. Pistons 29 are mounted within the cylinders 28, the upper ends of the pistons 29 being connected to supports 30 which in turn, are connected by means of transverse floor members 31. A suitable flooring, for example a ventilating expanded metal flooring, is carried by the supports 30 and members 31, the flooring 32 surrounding the track members 26 and the connecting members 25 completely.

The cylinders 28 and the pistons 29 positioned therein are designed to act as hydraulic rams and adapted to lift the longitudinal supporting members 30 and transverse members 31 simultaneously, thereby raising and lowering the floor 32 surrounding the tracks 26 and central connecting portion 25. In this way, the tracks 26 and central connecting portion 25 is vertically immovable while the flooring 32 may be raised or lowered to and from a plane coinciding with the plane of the tracks 26 and a suitable position beneath the plane of the tracks 26.

A source of pressure fluid, such as a pump and surge tank may be connected to the cylinders 28 by any suitable means, the source of pressure fluid being either carried by the movable washing device herein described or positioned exteriorly thereof, for example in the machinery room 11, and connected to the cylinders 28 by flexible pipe means. Suitable valves may be positioned upon the device at a desired point and operably connected to the source of fluid pressure and cylinders 28 so as to regulate the activation of the pistons 29 within the cylinders. Details of this construction are not shown as their design and method of operation are well known to those skilled in the art.

Longitudinal motion along the pit 6 may be imparted to the entire device by means of a chain drive or by motors 33, mounted in close proximity to the trucks 20 and adapted to drive the wheels 21 along the trucks 20 by means of suitable gearing 34.

It will be seen, therefore, that the entire washing device is movable down the length of the pit 6 and carries with it a vertically immovable support for a vehicle and a vertically movable floor surrounding said support, the vertical movement of the floor being independent from the means for causing the entire device to move along the length of the pit 6, thereby allowing a simultaneous transverse movement of the entire unit and a vertical movement of the floor 32 if this is desired. By means of this device, vehicles may be transferred from any of the runways above pits 2, 3, 4 and 5 onto the transverse washing device hereinabove described and then the vehicle together with the transverse device moved down the pit 6 to any desired point so as to discharge the vehicle into any of the pits or runways over said pits either on one or the other side of the pit 6. For example, a vehicle may be picked up by the movable transverse member from a position above pit 5 and carried by it to a point opposite pit 7 and then discharged upon the tracks or runways 35 positioned above the pit 7.

It is understood that the device positioned in pit 6 and described above is adapted for washing vehicles thereon and is necessarily equipped with sprays, nozzles and other sources of water, cleansing solutions, steam and the like, which liquids and fluids may be supplied thereto from suitable tanks, heaters or boilers, mounted upon the device or upon the ground as in room 11, by flexible hose or pipe means.

The movable washing device may also be equipped with platforms 40 supported by means of columns 41 mounted upon the girders 19 and passing through suitable openings in the movable floor 32. The platforms may be in a plane slightly above the tops of vehicles positioned upon the supports 26 so that operators positioned on such platforms 40 may easily clean, wash and dress the tops of the vehicles.

Suitable automatic stop devices may be used so as to automatically stop the movable washing device in correct alignment with any of the pits 2, 3, 4 or 5, or 7 and 8.

The pits 7 and 8 may be of any desired depth, say, three to five feet, and may be intercommunicative, that is, the space beneath the floor 36 may be a continuation of the pits 7 and 8 and such space may be utilized for various pumps, tools and other supplies. Between the runways 35 and 37 longitudinally movable platforms or floors 38 and 39 may be provided, said platforms or floors 38 and 39 being equipped with wheels adapted to run on suitable tracks fastened to the sides of the runways 35 and 37.

The method of washing, cleaning and greasing or lubricating vehicles using the above described apparatus is relatively simple. Vehicles may be propelled upon that section of the ground indicated by the numeral 9 and then positioned upon runways 14, 15 and the like above pits 2, 3, 4 and 5.

Operators positioned in the pits and on the floors 17 surrounding the pits may then perform any desired operation, for example, when automobiles are the vehicles being treated by my method and in the apparatus above described, a vehicle positioned, say, above pit 4 may be first cleaned out, the crank case drained, the differential and transmission lubricated and the motor and accessories beneath the hood thoroughly greased and lubricated. If desired, the entire chassis may be cleaned by means of steam or other cleansing agent, while the vehicle is in position above the pit. It will be understood that a large number of operators may be employed upon a vehicle at the same time, a certain number of operators being positioned beneath the vehicle in the pit and a further number being positioned on the floors 17 surrounding the pit. In this way, every portion of the vehicle is accessible.

After the vehicle has been lubricated, the transfer car or movable washing device positioned in the pit 6 is moved opposite the pit upon which the vehicle is positioned and the vehicle then transferred to the vertically immovable track portions 26 mounted upon said device. The platform or flooring 32 surrounding the vertically immovable track portion 26 is then depressed so that operators stationed upon the flooring 32 are brought into direct working contact with the lower portions of the vehicle at rest upon the tracks 26. It will be understood that operators stationed upon the vertically movable flooring 32 are provided with water, steam, cleansing solutions, and other implements adapted to clean and wash a vehicle.

In view of the fact that the flooring 32 extends between the track portions 26, the operators are capable of entirely surrounding the vehicle and operating upon all of the portions thereof. The entire device may during this operation be moving toward an exit pit, for example, pit 7 and as it is moving in that direction, the floor 32 may be raised by manipulation of suitable valves and operation of the hydraulic rams 28 until the floor 32 is on the level with the tracks 26. The operators positioned upon the floor 32 are then in position to wash thoroughly the upper portions of the vehicle. The space between the supports 26 and the tracks 35 above pit 7 is completed by the floor 32 when the transfer device as a whole reaches a position immediately in front of the pit 7 and the vehicle positioned upon the supports 26 may then be propelled off the transfer device onto the tracks 35 positioned on each side of the pit 7 without any loss of time.

While the vehicle is on the runway or tracks 35 above the pit 7 it may be wiped off, polished or refilled with oil and additional lubricating operations performed. It has been found that an automobile of any standard make may be completely lubricated and washed in about eighteen minutes, eight minutes of the time being consumed above the pits 2, 3, 4 and 5, two minutes being consumed on the transverse movable washing device in pit 6, and eight minutes being consumed in the pits 7 and 8. This time period may be changed somewhat by the character, number and scope of the operations, for instance not all cars have their chassis steam cleaned but merely washed.

It is to be further understood that various changes and modifications may be made in the construction and details of the subject matter of my invention without departing from the inventive conception herein disclosed. For example, the horizontally movable device positioned between the plurality of inlet and outlet tracks may be mounted in a circular pit instead of a transverse pit and be caused to revolve in said pit instead of moving bodily down the length of a pit. These and other modifications will be apparent to those skilled in the art.

I claim:

1. A vehicle washing table comprising a vertically immovable support for a vehicle, a platform surrounding said support, and means for moving said platform in a vertical plane.

2. A vehicle washing table comprising a vertically immovable support for a vehicle, a platform surrounding said support, means for moving said platform in a vertical plane, and means for moving said support and platform in a horizontal plane.

3. A vehicle washing table comprising a vertically immovable support for a vehicle, means for moving said support in a horizontal plane, a platform surrounding said support and carried by said support, means carried by said support for moving said platform to and from the top of said support and a lower plane, and a second platform above the top of said support and carried by said support.

4. A vehicle washing system comprising, a plurality of longitudinal tracks for vehicles leading to a transverse pit, pits between said tracks, a transversely movable table positioned in said transverse pit and a longitudinal track for vehicles leading away from said transverse pit and movable table.

5. A vehicle washing system comprising, a plurality of longitudinal tracks for vehicles leading to a transverse pit, pits between said tracks, a table positioned in said transverse pit adapted to support vehicles, a portion of said table being adapted to move in a vertical plane, and a longitudinal track for vehicles leading away from said transverse pit and table.

6. A vehicle washing system comprising, a plurality of longitudinal tracks, positioned above longitudinal pits, and adapted to support vehicles and lead the same to a transverse pit, transverse tracks positioned in said transverse pit, a table adapted to support vehicles movably mounted on said tracks and a longitudinal track and pit leading away from said transverse pit and movable table.

7. A vehicle washing system comprising, a plurality of longitudinal tracks positioned above pits and adapted to support vehicles and lead the same to a movable table, means for moving said table transversely to said tracks in a horizontal plane, a vertically movable portion on said table, hydraulic means for moving said vertically movable portion of the table to and from the top of said table and a lower plane, and a longitudinal track and pit leading away from said movable table.

8. A vehicle washing system comprising, a plurality of longitudinal tracks positioned above pits and adapted to support vehicles and lead the same to a transverse pit, a vertically immovable support for vehicles in said pit, a movable floor surrounding said support, hydraulic means for moving said floor to and from the top of said support and a lower plane, means for moving the support and table transversely to the longitudinal pits, and a longitudinal track leading away from the transverse pit.

9. A multiple automobile pit comprising a plurality of fixed trackways overlying servicing positions and a movable trackway adapted to align with any of the fixed trackways for the purpose described.

10. A multiple automobile pit comprising a plurality of trackways each overlying a plurality of servicing positions in the pit and transfer means at the end of the pit for transferring a vehicle from one trackway to another.

11. A multiple automobile pit comprising a common chamber and a plurality of parallel trackways arranged at the ground level and each overlying a plurality of servicing positions in said common chamber, and means for transferring the vehicles from one trackway to another.

12. A vehicle washing system comprising a plurality of fixed trackways for vehicles, overlying servicing pits, a transfer means at one end of said fixed trackways, said means being adapted to receive vehicles from any of said fixed trackways, and a separate trackway overlying servicing positions adapted to receive vehicles from said transfer means.

13. A vehicle washing system comprising a plurality of fixed trackways for vehicles overlying servicing pits, a transfer means at one end of said fixed trackways adapted to receive vehicles from any of said fixed trackways, and a separate trackway adapted to receive vehicles from said transfer means.

Signed at Los Angeles, Calif., this 26 day of March 1928.

IRA L. PULLIAM.